F. J. MATHEWS.
MOTOR SLEIGH.
APPLICATION FILED NOV. 17, 1914.
1,154,423.
Patented Sept. 21, 1915.
2 SHEETS—SHEET 2.
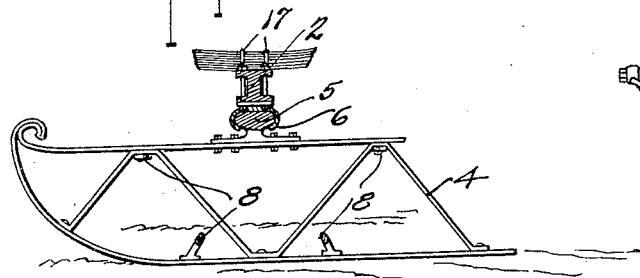
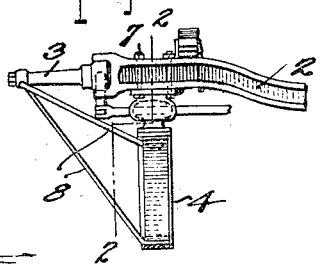
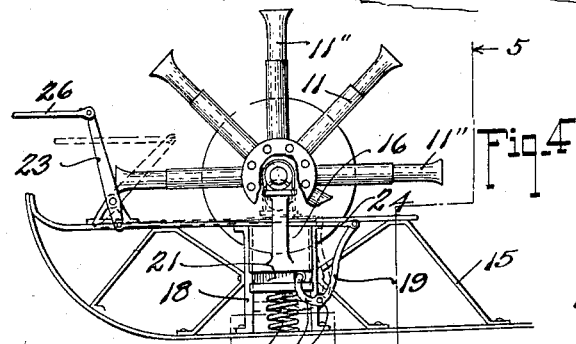
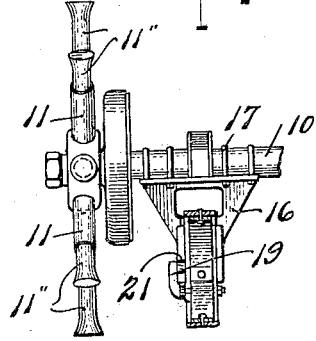
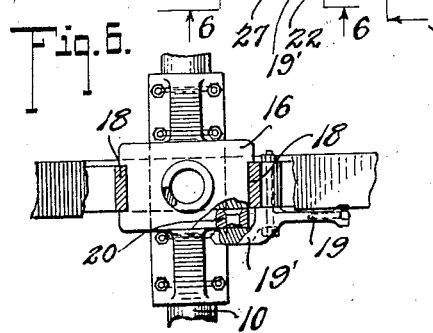
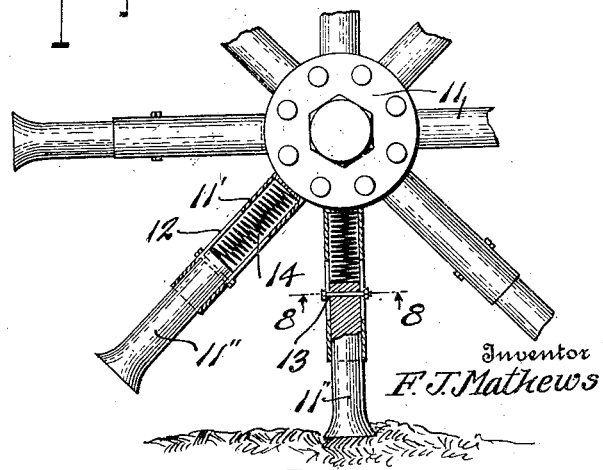
Witnesses
C. H. Wagner
D. R. Partello.
Inventor
F. J. Mathews
By Robbos Robb
Attorneys

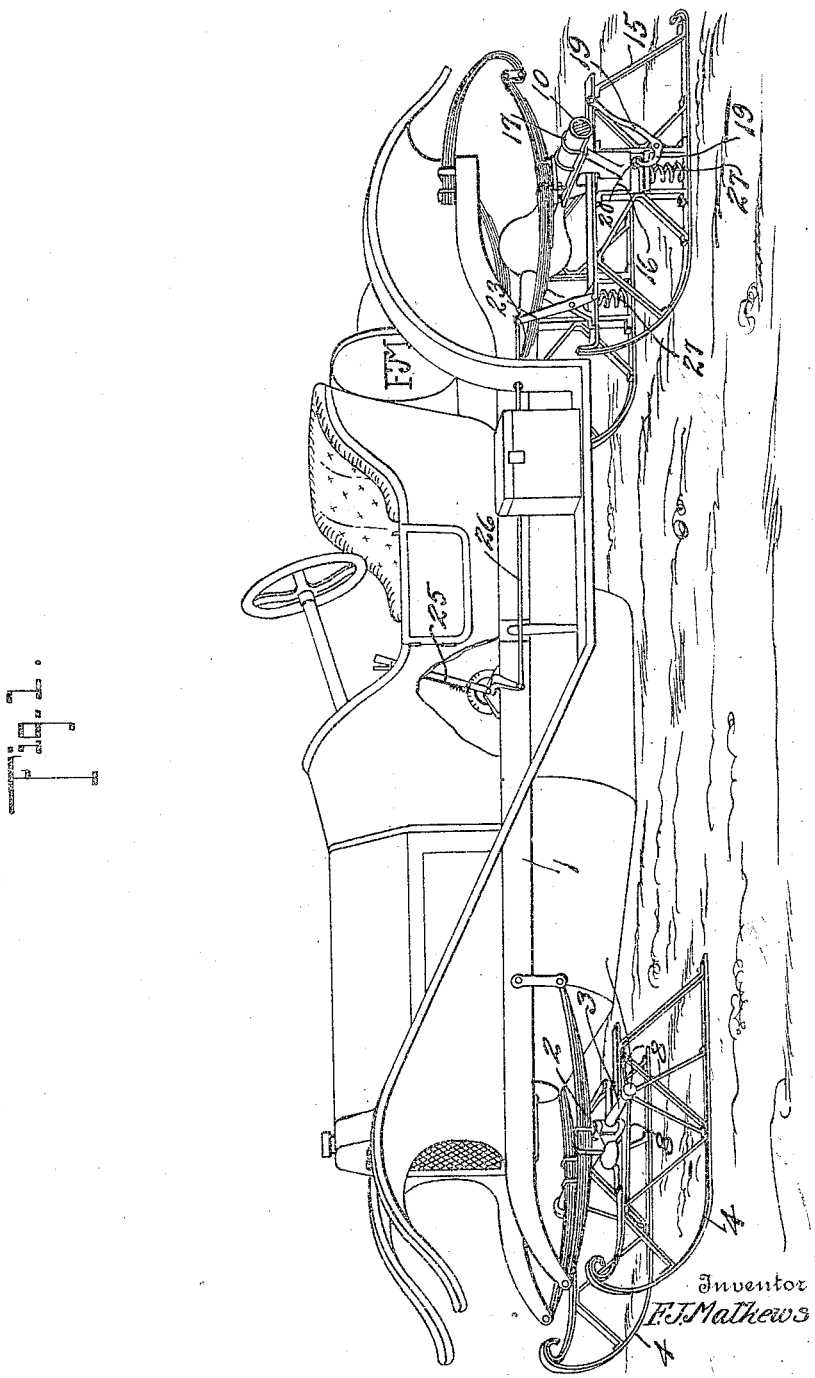

UNITED STATES PATENT OFFICE.

FRANK J. MATHEWS, OF BRILL, WISCONSIN.

MOTOR-SLEIGH.

1,154,423. Specification of Letters Patent. Patented Sept. 21, 1915.

Application filed November 17, 1914. Serial No. 872,569.

*To all whom it may concern:*

Be it known that I, FRANK J. MATHEWS, a citizen of the United States, residing at Brill, in the county of Barron and State of Wisconsin, have invented certain new and useful Improvements in Motor-Sleighs, of which the following is a specification.

The present invention has for its object the provision of a runner attachment especially adapted for motor vehicles, such that the vehicle is capable of being converted into a sleigh without requiring any special reconstruction of the vehicle aside from the removal of its wheels, while permitting of the utilization of the usual steering and propelling instrumentalities.

To this end, my invention embodies runner members which are secured to the body of the vehicle, the front runners being connected to the steering spindles while the rear runners are attached to the rear construction of the vehicle body for the purpose of regulating the contact of the propelling members which replace the rear driving wheels.

With the above and other objects in view, the invention consists of certain novel constructions, combinations, and arrangements of parts as will hereinafter be specifically described and claimed.

Reference will now be had to the accompanying drawings forming a part of this specification, wherein:

Figure 1 is a perspective view showing the attachment of the runner construction forming the embodiment of this invention to a conventional motor vehicle. Fig. 2 is a fragmentary, vertical sectional view on the plane indicated by the line 2—2 of Fig. 3. Fig. 3 is a detail view in elevation of one of the front runner members operatively connected to the vehicle axle. Fig. 4 is a side elevation of the rear runner construction of my invention attached in position, a portion of the propelling wheel being broken away to more clearly show the details of construction. Fig. 5 is a vertical sectional view on the line 5—5 of Fig. 4. Fig. 6 is a horizontal sectional view on the line 6—6 of Fig. 4 looking in the direction of the arrows. Fig. 7 is a fragmentary side elevation of one of the propelling wheels, parts being broken away and shown in section. Fig. 8 is a horizontal, sectional view on the line 8—8 of Fig. 7.

Throughout the following detail description, and on the several figures of the drawings, similar parts are referred to by like reference characters.

Referring to the drawing and specifically describing the invention, the numeral 1 represents a motor vehicle body of any conventional form and construction, and having the front axle 2 and steering spindles 3 of the usual type. In changing of the motor vehicle to a motor sleigh it involves the attachment of my front runners 4 to the forward construction of the vehicle as most clearly shown in Figs. 1, 2 and 3. The upper frame member of each runner 4 is provided with a ball member 5 which is disposed in a socket 6 adapted to be attached to the axle 2 by means of the clamping bolts 7. Projecting laterally from each runner 4 are a plurality of braces 8 the outer extremities of which carry a spindle cap 9 adapted to be inserted over the outer extremity of the spindle 3. It will be obvious that to enable the attachment of these runners in the manner just described the forward wheels of the vehicle are removed, and the peculiar connection of the runners to the spindles enables the usual steering mechanism of the vehicle to steer said runners. In like manner, the rear wheels of the vehicle in changing the same to a sleigh are removed from the rear axle 10 and propelling members 11 are substituted therefor. These propelling members or wheels, best seen by reference to Fig. 7 consisting of a plurality of spokes each of which comprises an upper tubular section 11' and a telescoping extremity 11'', the upper section of each spoke being provided with diametrically opposing slots 12 through which extends the bolt 13 carried by the lower member 11'' and which bolt is adapted to guide and limit the telescoping movement of the latter. Interposed between the outer member 11'' and the base of the tubular section 11' is spring 14 which normally holds the yielding extremity at its outermost position. The yielding spoke construction is advantageous as it enables the relative accommodation of the propelling members to uneven surfaces over which the vehicle operates and it may also be stated that it enables the adjustment of these members with respect to the surface in such manner as to afford the necessary amount of traction in the operation of the device.

The body of the vehicle is supported at each side by the rear runners 15 which are each connected to the rear axle 10 by the supporting member or block 16 attached to said axle by clamping members 17. The edges of the block 16 are grooved and this member is slidably mounted upon the runner between the spaced vertical standards 18 a pair of which is provided for each runner. The block is freely slidable vertically between the standards mentioned and is supportingly held at adjusted positions by means of a lever 19, the arm 19' of which is provided with a roller bearing 20 at its extremity engaging in a horizontal channel 21 formed at the lower portion of each block. The other end of the lever which is pivotally secured at 22 to one of the standards is connected to a vertically disposed lever 23 by means of a rod 24 and the lever 23 is in turn connected to an operating lever 25, seen in Fig. 1 by means of the rod 26. The lever 25 is located at an accessible place for the operator and designed to control the adjustment of the body of the vehicle with respect to the runners which adjustment regulates the contact of the propelling members 11 with the surface of the ground as will be obvious. Thus movement of the lever 19 will cause the arm carrying the bearing 20 to move the latter in the channel 21 and this will raise or lower the block or vehicle supporting member 16.

I preferably interpose between the runner base and the lower edge of each block an expansion spring 27 which tends to facilitate the adjustment of the member 16 by yieldingly holding the same during the adjustment by means of the lever 25. It will be understood, of course, that this lever 25 simultaneously actuates the lifting levers 19 for each block 16 of the respective rear runner members.

It will be apparent to those skilled in the art to which this invention refers that the change involved in arranging for a motor-sleigh as hereinbefore described may be quickly accomplished and the vehicle is thus readily adapted for operation in the usual manner or as a motor-sleigh when the conditions of the ground surface make such change desirable.

Having thus described my invention, what I claim as new is:

1. In a runner attachment for vehicles, the combination of runners, spaced guide standards carried by said runners, body engaging members movable between said standards for adjusting the vehicle body with respect to the runners, and supporting levers pivotally mounted upon the standards and having an arm movably connected with the body supporting members whereby to raise and lower the same.

2. In a runner attachment for vehicles, the combination of runners, spaced guide standards carried by said runners, body engaging members movable between said standards for adjusting the vehicle body with respect to the runners, supporting levers pivotally mounted upon the standards and having an arm movably connected with the body supporting members whereby to raise and lower the same, and means interposed between the body supporting members and the runners for yieldingly holding the former during adjustment of the same.

3. In a runner attachment for vehicles, the combination of runners, spaced guide standards carried by said runners, body engaging members movable between said standards for adjusting the vehicle body with respect to the runners, supporting levers pivotally mounted upon the standards and having an arm movably connected with the body supporting members whereby to raise and lower the same, springs interposed between the body of the supporting members and the runners for yieldingly holding the former, the body supporting members aforesaid having channels formed therein, a bearing carried by the lifting levers engaging in the channel of the body supporting members, and operating means for actuating the lifting levers and holding the same at adjusted positions.

In testimony whereof I affix my signature in presence of two witnesses.

FRANK J. MATHEWS.

Witnesses:
F. E. KELSEY,
GWIN KELSEY.